United States Patent [19]

Dietlein et al.

[11] 4,171,079

[45] Oct. 16, 1979

[54] SKI LOCKING MECHANISM

[76] Inventors: Robert W. Dietlein; William R. Dietlein, both of 3040 Deer Run Rd., Carson City, Nev. 89701

[21] Appl. No.: 905,596

[22] Filed: May 15, 1978

Related U.S. Application Data

[63] Continuation-in-part of Ser. No. 837,765, Sep. 29, 1977, Pat. No. 4,143,799.

[51] Int. Cl.² ............................................. B65D 71/00
[52] U.S. Cl. ........................... 224/45 S; 280/11.37 A; 70/58; 24/73 SG
[58] Field of Search ............... 224/45 S; 280/11.37 A, 280/11.37 K, 11.37 E; 211/605 K; 70/58; 24/81 CC, 81 SK, 73 SG, 211 R

[56] References Cited

U.S. PATENT DOCUMENTS

| 3,643,810 | 2/1972 | Highberger | 224/45 S |
| 4,020,661 | 5/1977 | Rich | 70/58 |
| 4,043,493 | 8/1977 | Camelio | 280/11.37 A |

FOREIGN PATENT DOCUMENTS 72124 5/1947 Norway ............................. 280/11.37 A Primary Examiner—Robert J. Spar
Assistant Examiner—Kenneth W. Noland
Attorney, Agent, or Firm—William W. Haefliger

[57] ABSTRACT

A portable ski locking device releasably attaches to skis, and is releasably connectible to auxiliary fixtures such as posts, beams, etc.

8 Claims, 7 Drawing Figures

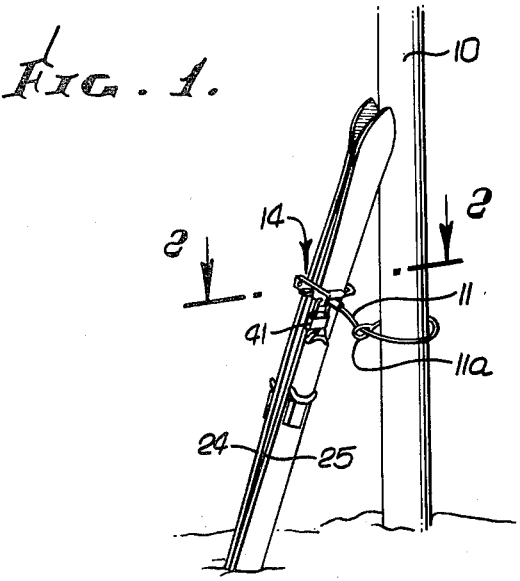
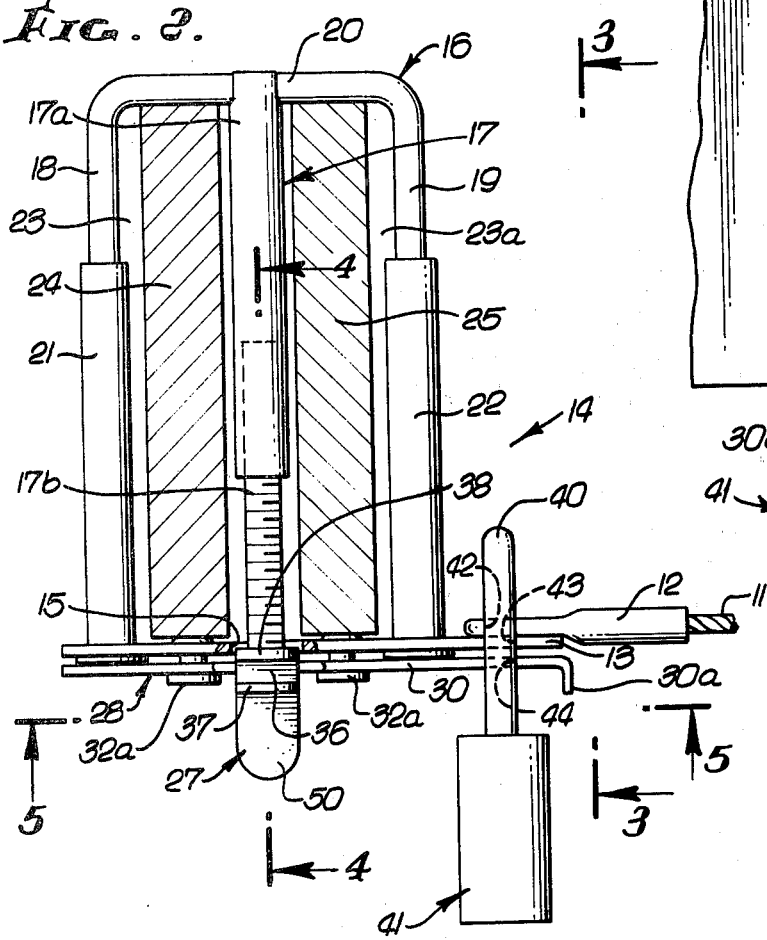
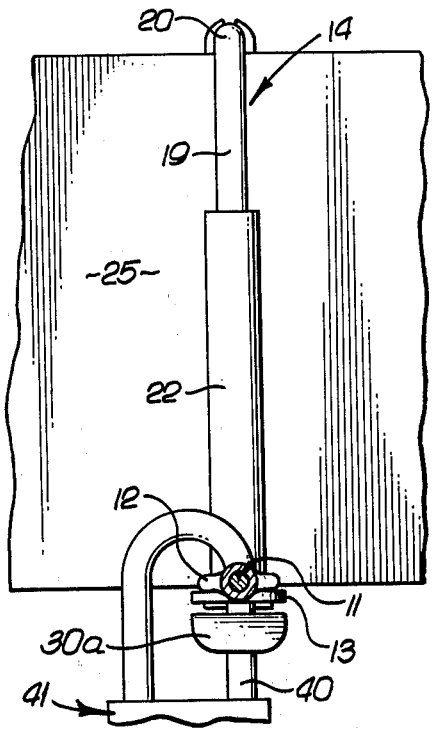
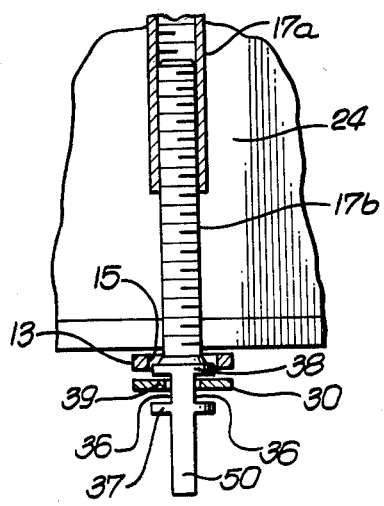

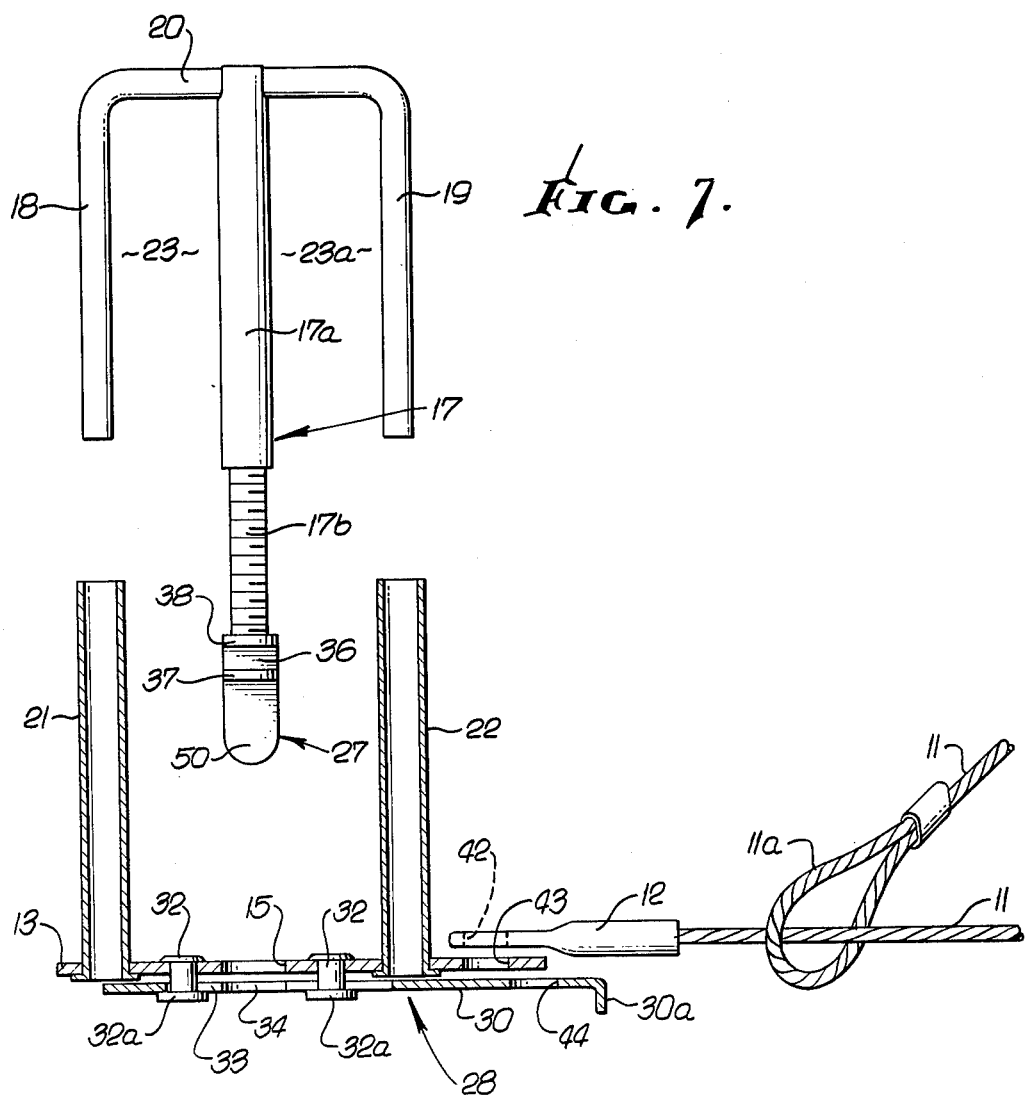

SKI LOCKING MECHANISM

BACKGROUND OF THE INVENTION

This application is a continuation-in-part of our prior application Ser. No. 837,765, filed Sept. 29, 1977 now U.S. Pat. No. 4,143,799.

This invention relates generally to locking or retention devices, particularly for skis, and more particularly concerns a highly portable device which a skier may carry with him and which he may use to lock his skis to fixed structure such as beams, columns, door handles, etc.

With the expansion in popularity of ski activity, a corresponding need has arisen for reliable, simple and effective means to prevent theft of skis, left outside ski lodges for example. Usually, the skier will drive the lower ends of his skis into the snow and leave them in that position while he temporarily walks elsewhere, as to a ski lodge or hut; however, theft is then easily accomplished. Prior locking devices such as racks have been non-portable, so that the skier must locate same before gaining access to their use; also, such devices may be unavailable, particularly at the location where the skier desires to leave his skis.

SUMMARY OF THE INVENTION

It is a major object of the invention to provide a locking device which is portable and adapted to ski retention at any location where a heavy fixture is found, the device being readily attachable to such fixture.

Basically, the device comprises (a) a laterally extending base defining a through opening, (b) a retainer having a first leg projecting longitudinally toward the base, said leg including two sections with adjustably threaded interengagement to accommodate lengthening or shortening of said one leg, (c) a head on one of said sections sized for free passage through said base opening, the head and said one section being rotatable relative to the other of said section and relative to the base, and (d) a keeper movably attached to the base and having an opening therethrough to pass the head when the keeper is in a first position, the keeper having a locking position in which the keeper and head have tongue and groove interconnection acting to block said head rotation and also to block longitudinal movement of the head relative to the keeper and base.

As will appear, the retainer typically includes leg means, such as two guide legs, extending generally toward the base and so related to the first leg and base as to retain a ski or skis adjacent the first leg when the keeper is in locking position. Also, the head on the first leg typically defines a groove to receive a tongue on the keeper when the head has been rotated to bring the groove into lateral alignment with the keeper tongue. As a result, the opening in the base may freely pass the head in all rotary positions thereof, which adds to the ease of use of the device. Further, the device is constructed to releasably connect to a flexible metal cable which may be wrapped about the fixed structure, thereby to lockably hold the device to such structure, and an auxiliary lock may be employed to lock the keeper in locking position relative to the base, as well as to lock the cable to the base, in the manner to be described. As a result, the components may be easily carried by a skier in his pocket, for use whenever fixed structure is available.

These and other objects and advantages of the invention, as well as the details of an illustrative embodiment, will be more fully understood from the following description and drawings, in which:

DRAWING DESCRIPTION

FIG. 1 is an elevation showing a pair of skis retained to fixed structure;

FIG. 2 is an enlarged frontal elevation showing a locking device embodying the invention, and as also been in FIG. 1;

FIG. 3 is a side elevation on lines 3—3 of FIG. 2;

FIG. 4 is a section on lines 4—4 of FIG. 2;

FIG. 5 is a bottom plan view on lines 5—5 of FIG. 2;

FIG. 6 is a view like FIG. 5, but with the keeper out of locking position; and

FIG. 7 is an exploded view of the parts of the locking device shown in FIG. 2.

DETAILED DESCRIPTION

In FIG. 1, fixed structure in the form of a post is seen at 10, with a flexible metal cable 11 extending about the post and through a cable loop 11a. A fixture 12 attached to the end of the cable attaches to the base 13 of a ski locking device generally indicated at 14, with the result that the skis are secured to the post. See also FIG. 2.

Base 13 extends generally laterally, and may comprise a metallic plate defining a through opening 15 which is shown as circular. A retainer 16 is associated with the base, and has a first leg 17 projecting longitudinally toward the base. That leg typically includes two sections with adjustable threaded interengagement to accommodate lengthening or shortening of the overall leg. See for example internally threaded sleeve 17a connected to externally threaded pin 17b. The retainer may also have guide leg means extending generally toward the base, there being structure on the base telescopically and slidably interfitting the guide leg means which is spaced laterally from leg 17. In the example, the guide leg means includes two guide legs 18 and 19 spaced at opposite sides of leg 17, and extending generally parallel to same. A cross piece 20 connects legs 18 and 19 to leg 17. Legs 18 and 19 telescopically and guidably interfit the tubular structure or members 21 and 22 integral with the base, whereby the length dimension between the cross piece 20 and base 13 may be adjusted to conform closely to the widths of skis 24 and 25 received through openings 23 and 23a formed between the legs. The ski widths are normally narrower at mid-portions between their end portions, whereby the device embracing such mid-portions is retained to the skis, against dislodgement over the ski end portions.

Also provided is a head 27 on one of the sections (i.e., section 17b) of leg 17, the head being typically sized for free passage through the base opening 15 in all rotary positions of the head and leg section 17b. Accordingly, ease of endwise adjustment of the retainer 16 is assured. In addition, a keeper 28 is located adjacent and parallel to the base, the keeper being movably attached to the base to shift into and out of locking relation with the head. The keeper may take the form of a slider plate 30 turned at 30a to provide a handle. Its attachment to the base may be afforded by rivets 32 joined to the base and projecting downwardly through lateral slots 33 through the keeper. Rivet heads 32a are wider than the slots, to retain the keeper close to the base. The keeper also defines a through opening 34 which aligns with the opening 15 through the base in a release position of the keeper, as seen in FIGS. 6 and 7. Opening 34 typically intersects slots 33 at opposite lateral sides of that opening.

The keeper has a locking position, as for example is shown in FIGS. 2, 4 and 5, in which the keeper and head 27 have tongue and groove interconnection, the latter acting to block head rotation and also to block longitudinal movement of the head relative to the keeper and base. For the purpose, the head may typically define grooves 36 extending generally normal to the longitudinal axis of the leg 17, the grooves located between two flanges 37 and 38 and presented outwardly at opposite sides of the head. The keeper defines two laterally extending tongues 39, which also serve to define one of the slots 33, the two tongues being shiftable into the two grooves, respectively, when the head has been rotated into position to bring the two grooves into alignment with the two tongues. This configuration is shown in FIGS. 2, 4 and 5 (one overlying tongue being broken away in FIG. 5). Accordingly, the device is then secured with the skis gripped at their mid-portions against relative passage endwise through spaces 23 and 23a.

Also, a pin or part 40 of an auxiliary locking device, such as padlock 41, is then insertible through aligned openings 42–44 in the fixture 12, base 13 and slides plate 30, to positively interconnect the cable to the base, and to prevent shifting of the keeper to release position.

In use, the skis are fitted edgewise into spaces 23 and 23a between legs 17a, 18 and 19. Then the legs 18 and 19 are slidably received into sleeves 21 and 22 and the head 27 passed through opening 15 and 34, the leg section 17b having been rotated in an unthreading direction to enable passage of the groove or grooves 36 at least through opening 15, i.e., when the skis are closely confined between base 13 and cross-piece 20. Thereafter, the head is rotated (as by finger turning of flat ends 50) to bring grooves 36 into lateral alignment with tongues 39, and the slider plate or keeper is slid laterally into FIGS. 2 and 4 position. Thereafter the lock pin 40 is inserted through openings 42, 43 and 44, and the lock secured. Cable 11 then is secured to the base, the cable having been previously secured to a post or other structure, as in FIG. 1 for example.

We claim:

1. In an adjustable locking device, the combination comprising
    (a) a laterally extending base defining a through opening,
    (b) a retainer providing means to retain a pair of skis and having a first leg projecting perpendicularly toward the base, said leg including two sections with adjustably threaded interengagement to accommodate lengthening or shortening of said one leg,
    (c) a head on one of said sections sized for free passage through said base opening, the head and said one section being rotatable relative to the other of said sections and relative to the base,
    (d) a keeper movably attached to the base and having an opening therethrough to pass the head when the keeper is in a first position, the keeper having a locking second position in which the keeper and head have tongue and groove interconnection acting to block said head rotation and also to block perpendicular movement of the head relative to the keeper and base, and
    (e) said head defining a groove extending generally normal to said laterally extending base, and said keeper defining a tongue which is shiftable into said groove only when said head has been rotated to bring said groove into alignment with said keeper tongue, said groove extending linearly and confined at one side of the head so that the tongue blocks rotation of the head when the tongue has entered the groove, and
    (f) auxiliary locking means locking said keeper to said base, and having another opening on said keeper and which comes into alignment with another opening of said base when said skis are to be locked within said retainer.

2. The combination of claim 1 wherein said retainer has guide legs extending generally toward said base, their being structure on the base telescopically and slidably interfitting said guide legs, said guide legs spaced laterally from said first leg.

3. The combination of claim 2 wherein said guide legs include two guide legs spaced at opposite sides of said first leg and extending generally parallel thereto.

4. The combination of claim 3 whereby said pair of skis respectively extend through the spaces between said guide legs and said first leg, said retainer retaining said skis when said second keeper is in said locking position with said keeper and head then having said tongue and groove interconnection.

5. The combination of claim 1 wherein said base opening is sized to freely pass said head, perpendicularly when said head is extended through said base opening, the keeper also defining a through opening to align with said base opening and freely pass the head in a release position of the keeper.

6. The combination of claim 1 including a flexible cable attached to said base and attachable to fixed structure.

7. The combination as defined in claim 1 wherein the head defines another groove like said first mentioned groove but confined at the opposite side of the head, the keeper defining another tongue to enter said another groove when the first mentioned groove receives the first mentioned tongue, each of said first mentioned and said another groove extending in generally parallel linear relation.

8. In an adjustable locking device, the combination comprising
    (a) a laterally extending base defining a through opening,
    (b) a retainer providing means to retain a pair of skis and having a first leg projecting perpendicularly toward the base, said leg including two sections with adjustably threaded interengagement to accommodate lengthening or shortening of said one leg,
    (c) a head on one of said sections sized for free passage through said base opening, the head and said one section being rotatable relative to the other of said sections and relative to the base,
    (d) a keeper movably attached to the base and having an opening therethrough to pass the head when the keeper is in a first position, the keeper having a locking second position in which the keeper and head have tongue and groove interconnection acting to block said head rotation and also to block perpendicular movement of the head relative to the keeper and base, (e) there being a flexible cable attached to said base and attachable to fixed structure, and (f) a fixture on the cable defining an opening which is in alignment with other openings defined by the base and keeper respectively and when the keeper is in said second locking position, said three openings when in alignment being adapted to receive a part of an auxiliary locking device.

* * * * *